United States Patent
Musat et al.

(10) Patent No.: US 7,031,842 B1
(45) Date of Patent: Apr. 18, 2006

(54) SYSTEMS AND METHODS FOR COLLABORATIVELY VIEWING AND EDITING SEISMIC DATA

(75) Inventors: Iulian Musat, Houston, TX (US); Ovidiu Feodorov, Mountain View, CA (US); Dimitri Bevc, Pleasanton, CA (US); Alexander M. Popovici, Katy, TX (US)

(73) Assignee: 3DGeo Development, Inc., Santa Clara, CA (US)

( * ) Notice: Subject to any disclaimer, the term of this patent is extended or adjusted under 35 U.S.C. 154(b) by 90 days.

(21) Appl. No.: 10/787,505

(22) Filed: Feb. 26, 2004

Related U.S. Application Data

(60) Provisional application No. 60/450,290, filed on Feb. 26, 2003.

(51) Int. Cl.
*G06F 19/00* (2006.01)
*G01V 9/00* (2006.01)

(52) U.S. Cl. ...................................................... 702/16
(58) Field of Classification Search .................. 702/16, 702/14, 15, 6, 9, 3, 5, 4, 2; 703/10, 2; 715/754; 367/73
See application file for complete search history.

(56) References Cited

U.S. PATENT DOCUMENTS

| | | | | |
|---|---|---|---|---|
| 5,515,491 A | * | 5/1996 | Bates et al. | 715/754 |
| 5,796,396 A | * | 8/1998 | Rich | 715/741 |
| 5,828,372 A | * | 10/1998 | Kameda | 715/751 |
| 5,867,110 A | * | 2/1999 | Naito et al. | 340/286.05 |
| 5,938,724 A | | 8/1999 | Pommier et al. | 709/205 |
| 6,026,410 A | | 2/2000 | Allen et al. | 707/104.1 |
| 6,084,510 A | * | 7/2000 | Lemelson et al. | 340/539.13 |
| 6,105,055 A | | 8/2000 | Pizano et al. | 709/204 |
| 6,342,906 B1 | | 1/2002 | Kumar et al. | 345/751 |
| 6,430,567 B1 | | 8/2002 | Burridge | 707/102 |
| 6,493,635 B1 | | 12/2002 | Bevc et al. | 702/14 |
| 6,519,568 B1 | * | 2/2003 | Harvey et al. | 705/1 |
| 6,564,246 B1 | | 5/2003 | Varma et al. | 709/205 |
| 6,574,561 B1 | * | 6/2003 | Alexander et al. | 702/5 |
| 6,646,559 B1 | * | 11/2003 | Smith | 340/601 |
| 6,826,483 B1 | * | 11/2004 | Anderson et al. | 702/13 |
| 6,829,570 B1 | * | 12/2004 | Thambynayagam et al. | 703/10 |

(Continued)

OTHER PUBLICATIONS

Dave Ridyard, "Collaboration : Beyond the Browser", SEG Workshop: Changing the Way We Work- E-business and the Internet, Sep. 2001, one page.*

(Continued)

*Primary Examiner*—Donald McElheny, Jr.
(74) *Attorney, Agent, or Firm*—Law Office of Andrei D. Popovici

(57) ABSTRACT

In one embodiment, a computer-implemented seismic viewing/editing collaboration method includes performing real-time collaborative cursor tracking, copaging, picking, and image manipulation in a distributed-display-processing, peer-to-peer architecture. A parameterized, minimal set of information required to update a display is transferred directly between different clients. A group state containing events generated by different clients is enforced to be synchronized on the different clients.

44 Claims, 5 Drawing Sheets

U.S. PATENT DOCUMENTS

| | | | |
|---|---|---|---|
| 2002/0042846 A1* | 4/2002 | Bottan et al. | 709/249 |
| 2002/0055868 A1 | 5/2002 | Dusevic et al. | 705/9 |
| 2002/0075303 A1 | 6/2002 | Thompson et al. | 345/751 |
| 2002/0083098 A1 | 6/2002 | Nakamura | 715/513 |
| 2002/0188522 A1* | 12/2002 | McCall et al. | 705/26 |
| 2003/0023679 A1 | 1/2003 | Johnson et al. | 709/204 |
| 2003/0085923 A1 | 5/2003 | Chen et al. | 345/751 |
| 2003/0120690 A1 | 6/2003 | Schaeffer et al. | 715/500 |
| 2003/0142126 A1 | 7/2003 | Estrada et al. | 345/738 |
| 2003/0195994 A1 | 10/2003 | Burgess et al. | 719/310 |
| 2004/0044732 A1 | 3/2004 | Fushiki et al. | 709/205 |
| 2004/0049345 A1* | 3/2004 | McDonough et al. | 702/12 |
| 2004/0107249 A1 | 6/2004 | Moser et al. | 709/204 |

OTHER PUBLICATIONS

Bevc et al., (Internet Seismic Processing: A Paradigm Shift for Exploration, OTC 13276, Offshore Technology Conference, Apr. 30-May 3, 2001, pp. 1-4.*

Bevc et al., "Integrated Internet Collaboration," The Leading Edge, Jan. 2003, pp. 54-57.

Bevc et al., "Will Internet Seismic Processing Be the New Paradigm for Depth Migration Interpretation and Visualization?", First Break, Mar. 2002, pp. 168-172, vol. 20, No. 3, EAGE.

* cited by examiner

SYSTEMS AND METHODS FOR COLLABORATIVELY VIEWING AND EDITING SEISMIC DATA

RELATED APPLICATION DATA

This application claims the benefit of the filing date of U.S. Provisional Patent Application No. 60/450,290, filed Feb. 26, 2003, entitled "Systems and Methods for Collaboratively Viewing and Editing Seismic Data," which is herein incorporated by reference.

FIELD OF THE INVENTION

This invention relates to geophysical prospecting using seismic signals, and in particular to systems and methods for managing and viewing seismic data.

BACKGROUND

Computer-intensive processing of reflection seismic data is the main tool for imaging the Earth's subsurface to identify hydrocarbon reservoirs and determine rock and fluid properties. Seismic data are recorded at the earth's surface or in wells, and an accurate model of the underlying geologic structure is constructed by processing the data. In the past decade, 3-D seismic processing has shown far superior cost-effectiveness than conventional 2-D seismic processing. However, the reconstruction of accurate 3-D images of the subsurface requires the handling of a huge amount of seismic data (on the order of terabytes for a single modern marine 3-D survey) and the application of computer-intensive imaging algorithms. Even today, only large-scale parallel computers can image modern marine surveys with the most sophisticated algorithms within a useful turn-around time. Indeed, the use of large-scale parallel computers for seismic processing has achieved such technical and economical success that the geophysical market accounts for one of the largest commercial market for scientific high-performance computing.

Many exploration organizations have no direct access to high-end seismic imaging technologies because they lack the resources to acquire and maintain the necessary hardware and software. The cost of the required computing and data-storage facilities is still quite high, although it keeps going down. However, in perspective, even more problematic is the large investment in application development and system maintenance that the effective use of these computational facilities requires. These costs are not decreasing, they are actually increasing with the level of complexity and sophistication of the imaging applications. Many existing commercial packages are targeted to run effectively on workstations, not on large parallel systems, and thus are ineffective for the high-end applications. As a result, only the central processing departments of large oil companies can afford to employ large-scale parallel computers for imaging 3-D seismic data. The rest of the exploration industry outsources large 3-D seismic imaging projects to outside service companies.

According to this outsourcing model, the data are physically sent on tape to the service companies, who process the data with little input from the oil companies, and then deliver the final images after several months. This service model has been historically successful for exploring areas with relatively simple geology, but it has proven inadequate for exploring areas with complex geology, where most of the still undiscovered hydrocarbon reservoirs are yet to be found. In such areas, the data must often be imaged by applying 3-D prestack depth migration, instead of simpler and more traditional time imaging procedures. Depth imaging is potentially much more accurate than time imaging, but it is also less robust with respect to some of the processing parameters. In particular, depth imaging needs an accurate interval velocity function to properly focus the reflections. Because the velocity function cannot be uniquely determined from the data alone, a priori geological information must be taken into account, and the final results are greatly enhanced when geologists work closely with the processing team. However, in the typical interaction between service companies and oil companies, the geologist cannot be involved in the processing because of the physical distance and the difficulties caused by the old traditional service model.

SUMMARY

In the preferred embodiment, a computer-implemented seismic viewing/editing collaboration method includes performing collaborative cursor tracking, copaging, picking, and image manipulation in a distributed-display-processing, peer-to-peer architecture. A parameterized, minimal set of information required to update a display is transferred directly between different clients.

DETAILED DESCRIPTION

In the following description, a set of elements is understood to comprise one or more elements. It is understood that results and other data structures can be generated and/or stored in system memory and/or in files. Geophysical data encompasses recorded as well as synthetic data. Unless otherwise characterized, geophysical data processing is understood to broadly encompass any transformation, generation, visualization, use or accessing of geophysical data. An action performed automatically in response to an event is an action performed without requiring user intervention after the event. Unless otherwise limited, the term multicasting encompasses sending data to one or more recipients from a selected group, and is distinct from broadcasting, which involves sending data to any user having available equipment.

The following description illustrates the present invention by way of example and not necessarily by way of limitation.

Figure 1:
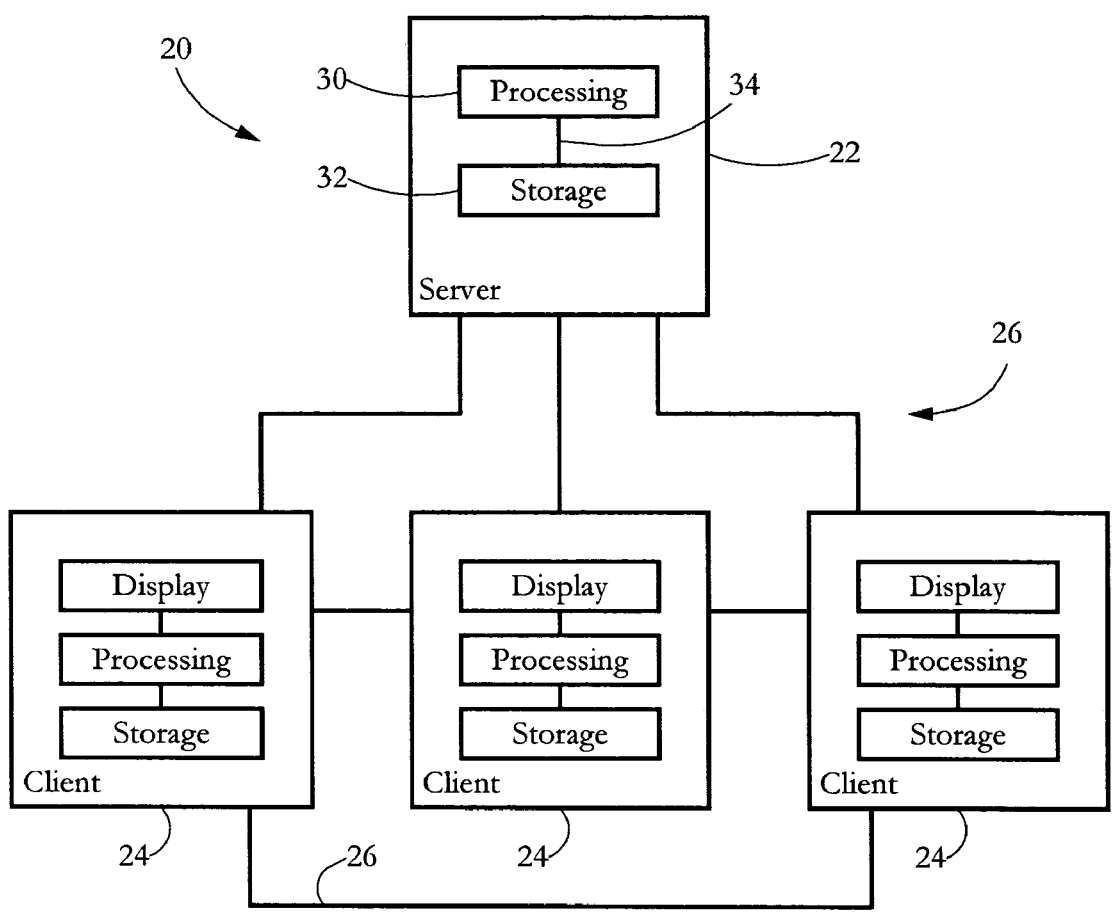
FIG. 1 is a schematic diagram of a preferred hardware environment of a seismic processing system of the present invention.

FIG. 1-A shows a schematic overview of a preferred hardware environment of a geophysical data processing system 20 of the present invention. System 20 comprises a server subsystem 22 and a plurality of client subsystems 24. Each client subsystem 24 is connected to server subsystem 22 and to the other client subsystems 24 over corresponding control and interpretation (analysis) links 26, which are preferably implemented over a wide area network such as the Internet. One or more of links 26 can also be implemented over a local area network (LAN). Client subsystems 24 can be located far away (for example within a different building or company) than server subsystem 22. Links 26 include client-server links connecting clients 24 to server 22, as well as client—client links interconnecting clients 24 directly (independently of server 22).

Server subsystem 22 preferably comprises a processing unit 30 and a data storage device 32. Processing unit 30 can include an integrated parallel computer such as an Origin 2000 from SGI or Enterprise from Sun Microsystems. Processing unit 30 can also include a cluster of interconnected computers, such as for example a Linux cluster forming a parallel computer. Data storage device 32 includes an array of tape and/or hard disk drives capable of storing geophysical data sets—on the order of hundreds of gigabytes to tens of terabytes of data. Processing unit 30 is connected to data storage device 32 over a data link 34. Processing unit 30 and storage device 32 are preferably located within the same physical facility, and can be implemented on the same computer system. Data link 34 can have a higher-bandwidth than control/interpretation links 26, and can be implemented over a local area network (LAN). Computationally-intensive tasks such as processing performed on seismic data sets (e.g. migration, velocity analysis, datuming) are preferably performed on server 22.

Each client subsystem 24 can be implemented using a personal computer or workstation with less storage and/or computational capability than server subsystem 22. Each client subsystem 24 includes processing, storage, and display and input devices (e.g. monitor and keyboard) for control, data entry, and data visualization. The client storage capabilities are preferably used to store synchronized local copies of seismic data sets used to generate 3D and 2D image displays, and associated data such as pick sets. The locally stored images can range in size from hundreds of kB to tens or hundreds of MB. Each client subsystem 24 includes a graphical user interface (GUI) and an associated geophysical data viewer. The data viewer preferably includes a 3D Viewer for displaying and manipulating 3D images, and a 2D Viewer for displaying and manipulating 2D images such as slices of a 3D image. Different client subsystems 24 may have different operating systems (platforms). The GUI and geophysical data viewer are preferably implemented in a platform-independent language such as Java. In one implementation, the GUI is run as an applet in a conventional browser, although in general the GUI can be provided as a standalone installed program. Both server 22 and clients 24 may have the Java Runtime Environment (JRE) installed thereon.

Clients 24 may be used to remotely control geophysical data processing performed on server 22, for example as described in U.S. Pat. No. 6,493,635, herein incorporated by reference. In addition, collaboration engines running on clients 24 also allow a geographically-distributed team of geophysicists to work together on a project/dataset. A processing project can include performing several data processing iterations over a common set of data files, pick files, and data processing flows. The collaboration engines preferably allow different members of the team to visualize, manipulate and edit in real time geophysical data, picks, and other parameters. During a collaboration session, the collaboration engines running on clients 24 can communicate directly with each other, without the intermediation of server 22, as described below. Clients 24 are also capable of retrieving data from server 22 at the beginning of a collaboration session, and of saving data on server 22 during a collaboration session or when the session is over.

At least some applications running on clients 24 may be connected to server 22 and to each other through a network protocol implemented using the Remote Method Invocation (RMI) application programming interface (API). Other applications may employ TCP or UDP connections. The Java Remote Method Invocation system allows an object running on one Java Virtual Machine (VM) to invoke methods on an object running on another Java VM. The system can be used to implement an authentication protocol based on the Java Authentication and Authorization Service (JAAS). A Secure Socket Layer (SSL) protocol can also be implemented selectively below the JAAS level, and on top of TCP/IP, for communications outside a secure zone such as a corporate Intranet. Code loaded on clients 24 and server 22 may be signed, i.e. assigned permissions based on a security policy currently in effect. The security policy can specify permissions available for given code, users, and locations.

Figure 2:
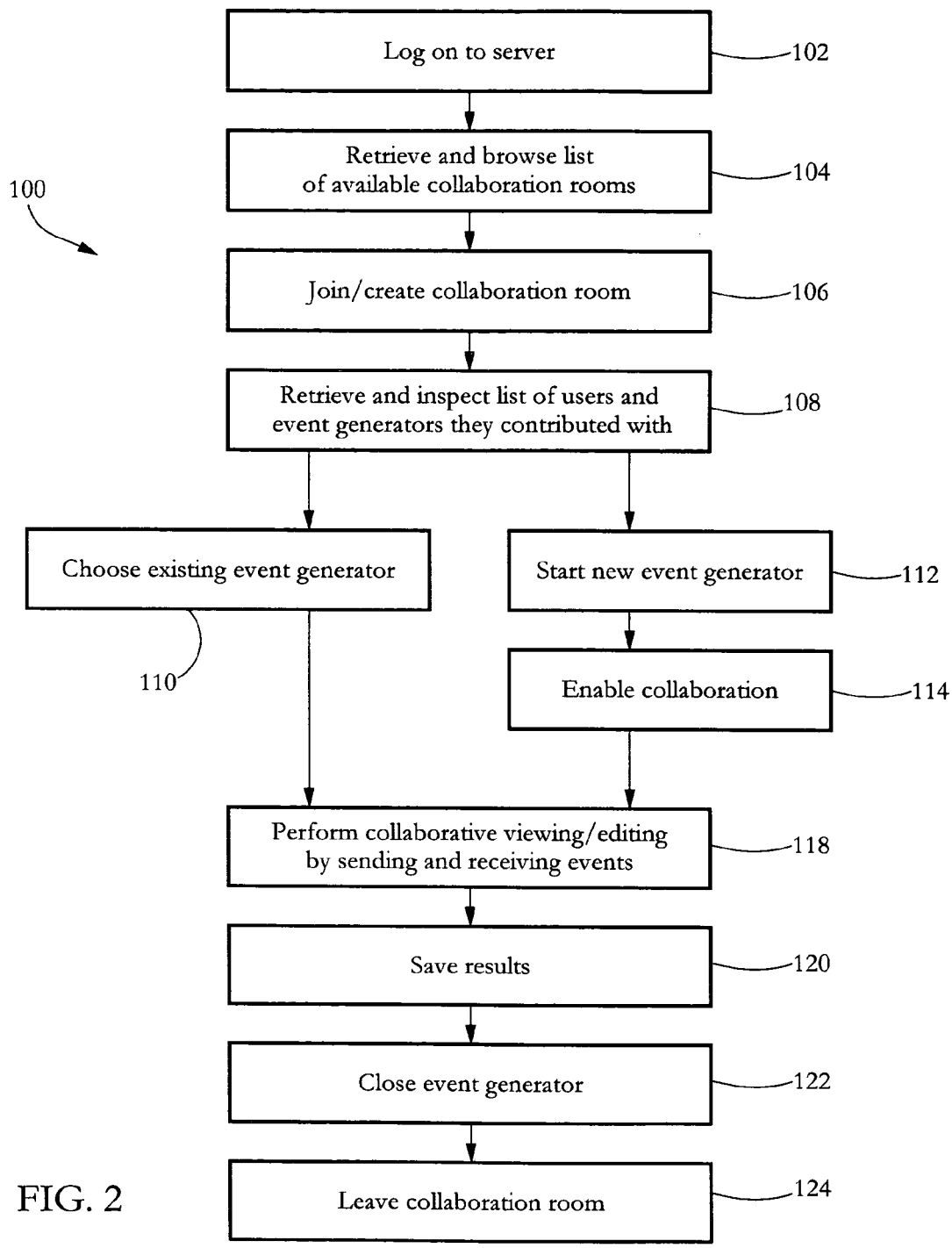
FIG. 2 is a flowchart illustrating a collaborative seismic processing method according to a preferred embodiment of the present invention.

FIG. 2 is a flowchart illustrating a seismic collaboration method 100 according to an embodiment of the present invention. A method such as the one shown in FIG. 2 may be implemented on each client 24. In a first step 102, a user employs the GUI of a client 24 to log on to server 22. Client 24 then retrieves project information from server 22, including a list of available collaboration rooms, as shown at 104. A project includes a set of seismic data files, a set of flow (processing) files, and a set of collaboration rooms. A project may include additional associated files. Each project can contain recursively an arbitrary number of sub-projects. A project group or workgroup can include multiple projects with associated user permissions, for example multiple projects of the same customer.

Collaboration Room

In a step 106, the user creates a new collaboration room or joins an existing collaboration room. A collaboration room is a virtual space maintained primarily on server 102, where a number of users meet and generate input that ultimately translates into quasi-concurrent changes applied to the data which is the subject of the collaboration. Each collaboration room can be graphically represented as an object in a project tree structure implemented as described in the above-incorporated U.S. Pat. No. 6,493,635. Preferably, a collaboration room has a specific icon, and is a subelement of the site tree root, of a project group or of a project. The hierarchical position of a collaboration room in the site defines the user permissions required to join the collaboration room. For example, all users may access a site collaboration room not associated with a project or project group. Only users with permission to access a specific project group or project can use the corresponding collaboration rooms. Different projects or project groups may correspond to different customers or groups within a customer company. A given project or project group can include multiple collaboration rooms, and a user may be a member of multiple collaboration rooms.

In a step 108, client 24 retrieves from server 22 a list of users and event generators the users/clients contributed to the collaboration room. The users present at a given moment in a collaboration room can be graphically represented as subelements of the room node in the tree structure. Once a user connects to a room and becomes member of that collaboration room, the user's name is made public and becomes available to the other members of the room. Preferably, a member has permanent access to the list of the other members participating in the collaboration, and is able to make two choices relative to any other member: whether to send events to the other member, and whether to receive/accept events from the other member. By default, all events (described below) are sent and received to/from all members.

Collaboration Event Generators

Preferably, available event generators include a chat interface, a 2D data viewer, and a 3D data viewer. The event generators are preferably run on each client 24, and the event generators communicate directly with other clients 24. The event generators may also communicate with server 22, for example to retrieve data at the beginning of a session and to save data at the end of a session. The chat interface is a part of the GUI allowing a collaboration room member to send and receive text events to/from other members. The 2D data viewer is a module specialized in displaying 2D geophysical images. The 2D data viewer preferably provides a number of tools including zoom, color map control, copaging, and picking. Events sent and received by a 2D data viewer preferably include cursor position tracking, copaging, image modification, and picking events. The 3D data viewer is a module specialized in displaying 3D geophysical images. The 3D data viewer preferably provides a number of tools including zoom, color map control, viewing angle control, and picking. Events sent and received by a 3D data viewer include cursor position tracking, projection transformation data, and picking events. Projection transformation data is information needed to apply a transform to the 3D data to generate a 2D image to be displayed on a monitor, for a given viewing angle and distance.

Preferably, events are divided into two categories: group state (stateful) events and transitory events. Group state events include image manipulation, copaging, and pick set manipulation events. Groups state events modify the group state on each client 24, and the group state is enforced to be synchronized between different clients 24. Preferably, the loss of state events in the transmission process is prevented completely, since such a loss would lead to desynchronization of the group state and would effect subsequent state data. Preventing data loss can be achieved through the use of a reliable multicast protocol which verifies the receipt of data, such as a protocol implemented using the open source JGroups (Javagroups) API. Delivery of a stateful event is complete only when all recipient clients have confirmed receipt of the event. Transitory events include cursor position tracking events. Loss of some transitory event data is acceptable. For transitory events, maintaining a high-throughput and low latency is preferably more important than preventing data loss. Transitory events are preferably transmitted using a transmission protocol which does not verify receipt of data.

The transmitted events are parameterized object descriptions (object parameters), rather than full graphical descriptions (pixel sequences). A set of object parameters includes, for example: a cursor/client identity, two cursor coordinates, and a cursor color. A client receiving the object parameters can construct a graphical representation of the object (e.g. cursor) locally. A full graphical description of a cursor would include an array of pixels defining an image area containing the graphical representation of the cursor.

A user using a client 24 may select an existing event generator from the list retrieved from server 22, as shown at 110 in FIG. 2. Choosing an existing event generator causes the event generator of the selected type to start running on client 24, and communicate with event generators of that type on other clients 24. A user may also start a new event generator (step 112) and enable collaboration for that event generator (step 114). Enabling collaboration leads to the transfer of an event generator identifier to server 22 for addition to the event generator list accessible by other clients 24. Starting or selecting an existing event generator such as a data viewer can involve transferring a data set including seismic data and associated other data (e.g. pick set, velocity model) from server 22 or one client 24 to another client 24.

In a step 118, multiple clients 24 perform collaborative viewing, manipulation, and editing of geophysical data and associated data. The collaborative process includes sending and receiving events directly to/from other clients 24, as described in further detail below. Each client 24 updates its display to reflect the actions performed by other clients 24 in real time, e.g. with an average latency of less than 1 s, preferably on the order of tens to hundreds of ms, ideally on the order of ms (i.e. less than 10 ms). In practice, it was observed that latencies on the order of a few ms are commonly achieved for clients collaborating from locations in Houston, Tex., and Silicon Valley, Calif. Once a user decides to end his or her participation in the collaborative process, the user can save the collaboration results on server 22 (step 120), close the event generator(s) running on the corresponding client 24, and leave the collaboration room.

Figure 3:
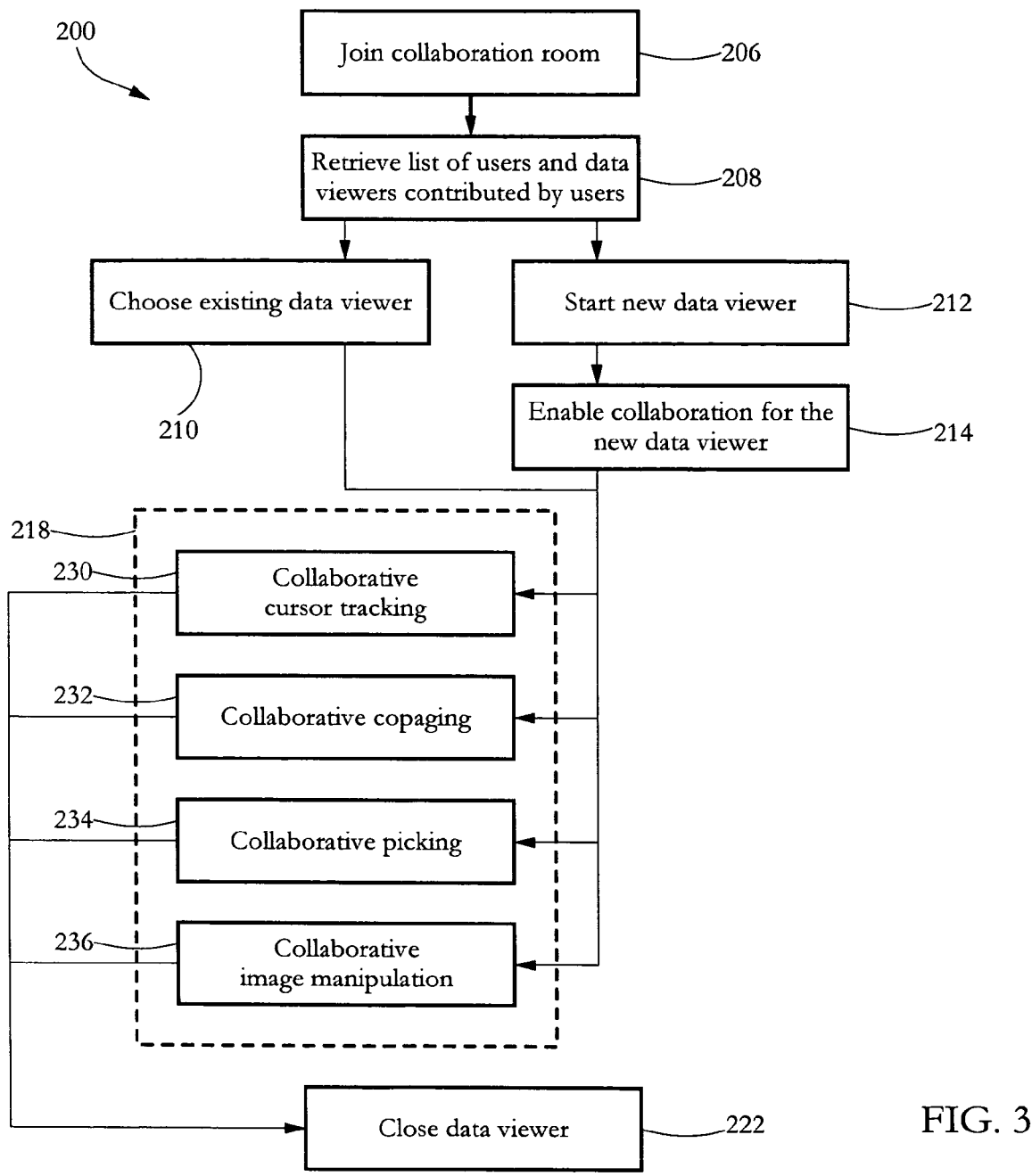
FIG. 3 is a flowchart illustrating a collaborative method including collaborative cursor tracking, copaging, picking, and image manipulation, according to a preferred embodiment of the present invention.
Figure 4:
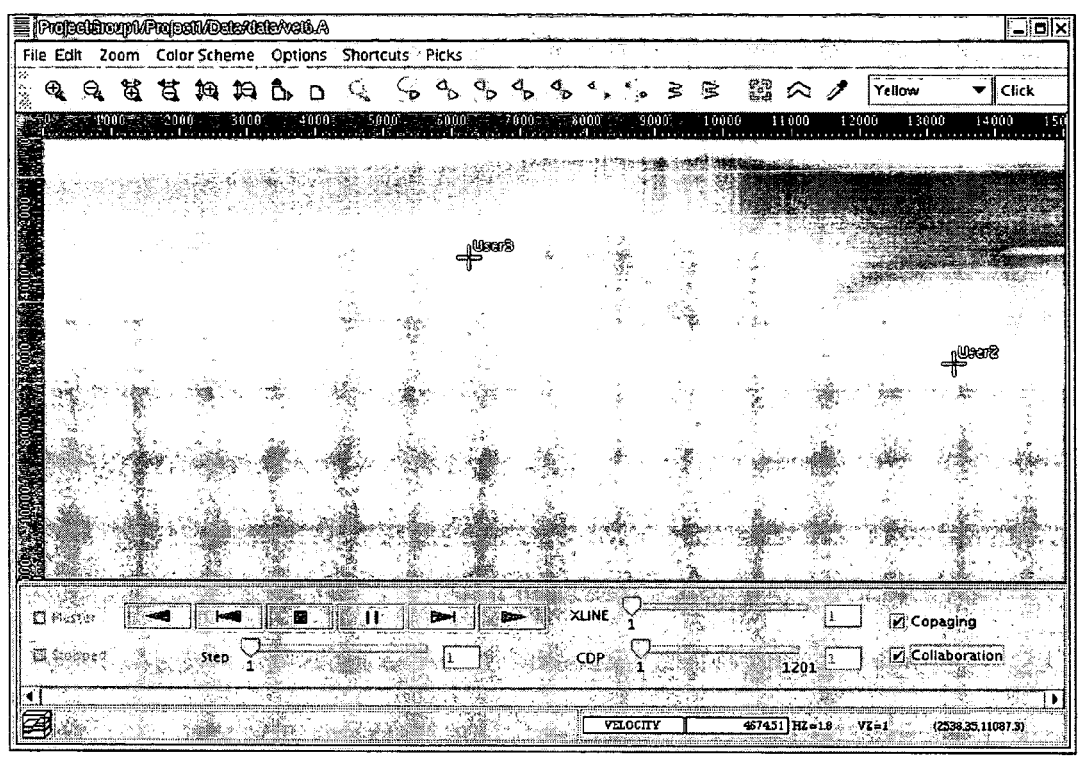
FIG. 4 shows an exemplary screen shot of a 2D viewer, including a display of two users' cursors, according to a preferred embodiment of the present invention.

FIG. 3 is a flowchart illustrating an exemplary collaborative data viewing method 200 according to a preferred embodiment of the present invention. A user employing a client 24 joins a collaboration room (step 206), and retrieves from server 22 a data set for the collaboration room including a list of users and data viewers contributed by the users to the collaboration room (step 208). The user can then choose an existing data viewer (step 210), or start a new data viewer (step 212) and enable collaboration for that data viewer (step 214). An exemplary screenshot of a data viewer according to an embodiment of the present invention is shown in FIG. 4.

The user can then engage in collaborative viewing, manipulation, and editing of geophysical data and associated data, as shown generally at 218. Preferably, the collaborative process can include collaborative cursor tracking (step 230), copaging (step 232), picking (step 234), and image manipulation (step 236). Steps 230–236 can be performed repeatedly, in parallel and in any order. Once the collaboration process is over, the user can close the data viewer (step 222). Each of the collaborative steps 230–236 is described in further detail below.

Collaborative Cursor Display

In step 230, a client 24 sends current cursor position data for that client directly to all other clients, and receives current cursor position data from all other clients. The current cursor position includes an identification of the client and two cursor coordinates. Each client 24 then locally generates corresponding displays of the local cursor and the remote cursors, and generates displays of corresponding cursor labels. FIG. 4 shows two exemplary cursor displays labeled "User 2" and "User 3." Each time a cursor is moved by its corresponding user, the corresponding client 24 sends directly to all other clients the current cursor position. Each client 24 updates its cursor display whenever the local cursor or a remote cursor has changed position. The cursor updating is performed in real time. The cursor position data is preferably transmitted directly between different clients 24, rather than indirectly through server 22, in order to minimize the latency of the cursor display process. Generally, the cursor position data may also be transmitted through server 22. The latency of the collaborative display process is also minimized by transmitting only cursor parameters needed to reconstruct each cursor locally, rather than a graphical representation of the cursor. Generating the cursor displays is then performed locally on each client 24 using the parameterized cursor display data.

Collaborative Copaging

In step 232, a client 24 can change the current 2D page or image displayed by the viewer. The current 2D page is typically a slice within a larger 3D volume comprising a plurality of 2D slices. Client 24 alters the data display to reflect the updated page, and sends updated page identification information directly to all other clients 24. All other clients then automatically update their data display to reflect the current 2D page chosen by the first client 24. Preferably, a user can choose to control co-paging manually, or automatically in a timed sequence.

Collaborative Picking

Figure 5:
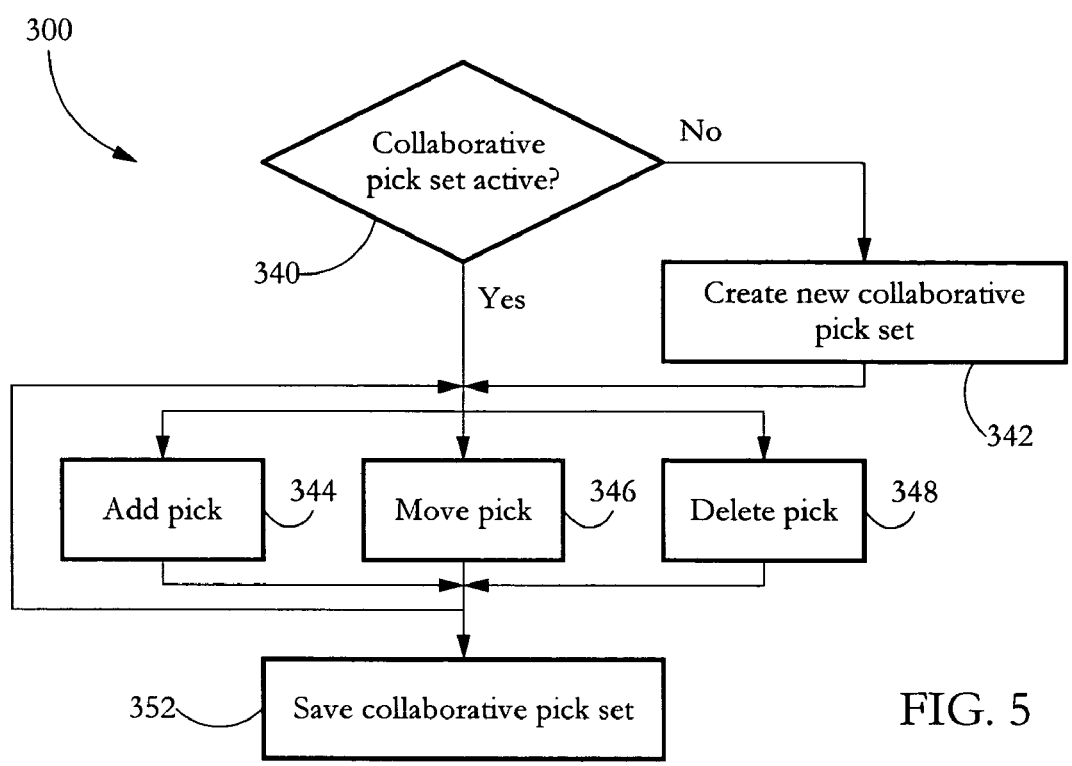
FIG. 5 is a flowchart illustrating a collaborative picking method according to a preferred embodiment of the present invention.

In a step 234 shown in FIG. 2, a user can employ a corresponding client 24 to collaboratively change a pick set corresponding to the current image displayed by the 2D viewer. FIG. 5 is a flowchart illustrating a collaborative picking method 300 according to a preferred embodiment of the present invention. In a first step 340, a client 24 determines whether any collaborative pick set corresponding to a selected data viewer is active. If no pick set is active, a user can direct client 24 to create a new active collaborative pick set (step 342). A pick set is preferably a shared state (e.g. a file or part of a file) stored in a synchronized manner on all clients 24, and associated with a 3D data set. Each pick can correspond to a location within a 2D or 3D image. The pick set preferably includes an ordered list of 3D coordinates for a plurality of picks, an identification of the 3D image to which the picks correspond, and a pick set name. The pick set is displayed by generating graphical representations of pick icons at each location, and of segments sequentially interconnecting the picks in the list. The collaborative pick set is maintained in a common, synchronized shared state on all participating clients 24. Multiple pick sets can be grouped together in a horizon.

Once a collaborative set is active, any client 24 can add (step 344), move (step 346) or delete (step 348) picks to/from the pick set. Preferably, a user may also change the display color of a pick set. The pick set modification commands are multicast to all other clients 24 in real time. The corresponding display generated by each viewer is updated to reflect the modifications to the pick set, by adding, moving, or deleting pick representations (icons) and associated segments from the corresponding image display. Any user may employ a corresponding client 24 to save the collaborative pick set.

Collaborative Image Manipulation

In a step 236 shown in FIG. 2, a user can employ a corresponding client 24 to collaboratively perform image manipulation operations on the current image displayed by the 2D viewer. The manipulated image is ordinarily a velocity model image. Image manipulation operations can include changing a velocity model displayed according to user commands, for example by moving velocity interface boundaries, filling an area defined between pick sets with a constant velocity, or painting a velocity within a region with a brush tool having a customizable width. A shared state is maintained for the current velocity model on all clients 24 that participate in a collaboration session.

In the preferred approach described above, parameterized interaction-related tasks are transferred directly between different clients 24, although generally server 22 may also be used as a communication relay, particularly when direct communication between clients 24 is difficult. Server 22 is preferably used only for computationally-intensive geophysical data processing steps such as imaging and velocity analysis, while communication, display generation, picking, co-paging and other tasks are performed locally on each client 24 and are transferred directly to other clients 24. The data transferred is parameterized, minimal meta-information (e.g. cursor coordinates) required to generate the displays by processing performed on each client 24, rather than processed graphical information (e.g. a set of cursor pixel locations). This parameterized, direct communications approach reduces the load on the links between clients 24 and server 22.

By contrast, in a system employing the X-protocol and it variations (e.g. the X11R6 Broadway extension), the display rendering and other related operations are performed on the server, and each client connects to other clients only through the server. While such a "thin-client" approach allows a conventional server application to be run remotely without editing, the network communications can suffer from high latency. The high latency is a consequence of the relatively large amount of graphical data sent between the server and the clients, and of the centralization of all communications through each client-server link. Collaboration in a system using a "thin-client" approach can be frustrating, particularly as the number of users increases.

The present invention further provides computers and computer systems programmed to perform the methods described herein, computer-readable media encoding instructions to perform the methods described herein, and computer apparatus comprising means for performing the method steps described herein. Suitable means for performing the method steps described herein include computer hardware programmed with corresponding software.

It will be clear to one skilled in the art that the above embodiments may be altered in many ways without departing from the scope of the invention. Accordingly, the scope of the invention should be determined by the following claims and their legal equivalents.

What is claimed is:

1. A computer implemented real-time collaborative geophysical data analysis method comprising:
   maintaining a plurality of instances of a group state on a corresponding plurality of interconnected clients;
   transmitting a parameterized description of a set of geophysical analysis events from a generating client to a rest of the plurality of clients, wherein the set of events comprises at least one of a set of identities of geophysical images to be displayed, a set of geophysical data picks, and a set of alterations of a geophysical velocity model;
   updating the plurality of instances of the group state to reflect the set of events; and
   using the group state to generate on each of the clients a display of a geophysical data set reflecting the set of events, to enable users of the plurality of the clients to collaboratively visualize and modify the display of the geophysical data set substantially simultaneously.

2. The method of claim 1, wherein the set of events includes the set of identities of geophysical images to be displayed.

3. The method of claim 2, wherein the set of events further includes the set of geophysical data picks.

4. The method of claim 3, wherein the set of events further includes the set of alterations of the geophysical velocity model.

5. The method of claim 4, wherein the set of events further includes a set of cursor positions for a plurality of cursors, each cursor being associated with one of the clients.

6. The method of claim 1, wherein the set of events further includes the set of geophysical data picks.

7. The method of claim 1, wherein the set of events further includes the set of alterations of the geophysical velocity model.

8. The method of claim 1, wherein the set of events further includes a set of cursor positions for a plurality of cursors, each cursor being associated with one of the clients.

9. The method of claim 1, wherein transmitting the parameterized description is performed directly from the generating client to the rest of the plurality of clients over peer-to-peer connections, without an intermediation of a central server.

10. The method of claim 1, wherein the plurality of clients are interconnected over a wide area network.

11. The method of claim 10, wherein generating the display on each of the clients is performed within 10 ms of a transmission of a latest event.

12. The method of claim 1, further comprising:
maintaining on the plurality of clients a corresponding plurality of instances of a list of client event generators that are members in a collaboration room, and
multicasting the parameterized description only to client event generators on the list.

13. A computer implemented real-time collaborative geophysical data analysis method comprising:
generating a first geophysical analysis event in response to a first user command on a first client of a plurality of interconnected clients, wherein the first event comprises at least one of an identity of a geophysical image to be displayed, a geophysical data pick, and an alteration of a geophysical velocity model;
transmitting a parameterized description of the first event from the first client to a rest of the plurality of clients;
receiving at the first client a parameterized description of a second event generated by a second client of the plurality of clients; and
automatically generating on the first client a display of a geophysical data set reflecting the first event and the second event, to enable users of the first client and second client to collaboratively visualize and modify the display of the geophysical data set substantially simultaneously.

14. The method of claim 13, further comprising automatically generating on the rest of the plurality of clients a corresponding plurality of displays of the geophysical data set reflecting the first event and the second event.

15. The method of claim 13, wherein the second event is a cursor position, and wherein the parameterized description of the second event includes a set of coordinates for the cursor position.

16. The method of claim 13, wherein the first event comprises the identity of the geophysical image to be displayed.

17. The method of claim 13, wherein the first event comprises the geophysical data pick.

18. The method of claim 13, wherein the first event comprises the alteration of the geophysical velocity model.

19. The method of claim 13, further comprising enforcing among the plurality of clients a synchronization of a group state reflecting the first event.

20. The method of claim 13, further comprising sending from the first client a geophysical data processing command to a geophysical data processing server connected to the first client over a wide area network connection, for directing the server to perform geophysical data processing on the geophysical data set, wherein the geophysical data processing command includes a flow description comprising identifications of an ordered plurality of geophysical data processing modules for performing the geophysical data processing.

21. The method of claim 13, further comprising:
receiving from a third client of the plurality of clients a parameterized description of a third event generated by the third client; and
automatically generating on the first client a display of a geophysical data set reflecting the first event, the second event, and the third event.

22. The method of claim 13, wherein the plurality of clients are interconnected over a wide area network.

23. The method of claim 22, wherein automatically generating the display on the first client is performed within 10 ms of a multicasting of the second event by the second client.

24. The method of claim 13, wherein transmitting the parameterized description is performed directly from the first client to the rest of the plurality of clients over peer-to-peer connections, without an intermediation of a central server.

25. A computer implemented real-time collaborative geophysical data analysis method comprising:
generating a plurality of first geophysical analysis events in response to corresponding user commands on a first client of a plurality of interconnected clients, wherein the plurality of first events comprises at least one of a set of identities of geophysical images to be displayed, a set of geophysical data picks, and a set of alterations of a geophysical velocity model;
transmitting parameterized descriptions of the plurality of first geophysical analysis events from the first client to a rest of the plurality of clients over the set of network connections;
receiving from a second client of the plurality of clients parameterized descriptions of a plurality of second geophysical analysis events generated by the second client; and
automatically generating on the first client a display of a geophysical data set reflecting the plurality of first event and the plurality of second events, to enable users of the first client and second client to collaboratively visualize and modify the display of the geophysical data set substantially simultaneously.

26. The method of claim 25, wherein the plurality of events includes the set of identities of geophysical images to be displayed.

27. The method of claim 26, wherein the plurality of events further includes the set of geophysical data picks.

28. The method of claim 27, wherein the plurality of events further includes the set of alterations of the geophysical velocity model.

29. A computer system programmed to perform a real-time collaborative geophysical data analysis method comprising:

generating a first geophysical analysis event in response to a first user command on a first client of a plurality of interconnected clients, wherein the first event comprises at least one of an identity of a geophysical image to be displayed, a geophysical data pick, and an alteration of an geophysical velocity model;

transmitting a parameterized description of the first event from the first client to a rest of the plurality of clients;

receiving at the first client a parameterized description of a second event generated by a second client of the plurality of clients; and automatically generating on the first client a display of a geophysical data set reflecting the first event and the second event, to enable users of the first client and second client to collaboratively visualize and modify the display of the geophysical data set substantially simultaneously.

30. The computer system of claim 29, the method comprising automatically generating on the rest of the plurality of clients a corresponding plurality of displays of the geophysical data set reflecting the first event and the second event.

31. The computer system of claim 29, wherein the second event is a cursor position, and wherein the parameterized description of the second event includes a set of coordinates for the cursor position.

32. The computer system of claim 29, wherein the first event comprises the identity of the geophysical image to be displayed.

33. The computer system of claim 29, wherein the first event comprises the geophysical data pick.

34. The computer system of claim 29, wherein the first event comprises the alteration of the geophysical velocity model.

35. The computer system of claim 29, the method further comprising enforcing among the plurality of clients a synchronization of a group state reflecting the first event.

36. The computer system of claim 29, the method further comprising sending from the first client a geophysical data processing command to a geophysical data processing server connected to the first client over a wide area network connection, for directing the server to perform geophysical data processing on the geophysical data set, wherein the geophysical data processing command includes a flow description comprising identifications of an ordered plurality of geophysical data processing modules for performing the geophysical data processing.

37. The computer system of claim 29, wherein automatically generating the display on the first client is performed within 10 ms of a multicasting of the second event by the second client.

38. The computer system of claim 29, the method further comprising:
receiving from a third client of the plurality of clients a parameterized description of a third event generated by the third client; and
automatically generating on the first client a display of the geophysical data set reflecting the first event, the second event, and the third event.

39. The computer system of claim 29, wherein the plurality of clients are interconnected over a wide area network.

40. The computer system of claim 29, wherein transmitting the parameterized description is performed directly from the first client to the rest of the plurality of clients over peer-to-peer connections, without an intermediation of a central server.

41. A computer-readable medium encoding instructions to perform a real-time collaborative geophysical data analysis method comprising:
generating a first geophysical analysis event in response to a first user command on a first client of a plurality of interconnected clients, wherein the first event comprises at least one of an identity of a geophysical image to be displayed, a geophysical data pick, and an alteration of a geophysical velocity model;
transmitting a parameterized description of the first event from the first client to a rest of the plurality of clients;
receiving at the first client a parameterized description of a second event generated by a second client of the plurality of clients; and
automatically generating on the first client a display of a geophysical data set reflecting the first event and the second event, to enable users of the first client and second client to collaboratively visualize and modify the display of the geophysical data set substantially simultaneously.

42. A real-time collaborative geophysical data analysis apparatus comprising:
means for generating a first geophysical analysis event in response to a first user command on a first client of a plurality of interconnected clients, wherein the first event comprises at least one of an identity of a geophysical image to be displayed, a geophysical data pick, and an alteration of a geophysical velocity model;
means for transmitting a parameterized description of the first event from the first client to a rest of the plurality of clients;
means for receiving at the first client a parameterized description of a second event generated by a second client of the plurality of clients; and
means for automatically generating on the first client a display of a geophysical data set reflecting the first event and the second event, to enable users of the first client and second client to collaboratively visualize and modify the display of the geophysical data set substantially simultaneously.

43. A computer-implemented real-time collaborative geophysical data analysis method comprising:
selecting a first 2D page of a 3D geophysical data set in response to a first user command on a first client of a plurality of interconnected clients;
transmitting an identification of the first 2D page from the first client to a rest of the plurality of clients;
receiving from a second client of the plurality of clients an identification of a second 2D page of the 3D geophysical data set selected by the second client; and
automatically generating on the first client a display of the first 2D page in response to the first user command, and subsequently a display of the second 2D page in response to the identification of the second 2D page, to enable users of the first client and second client to collaboratively visualize selected 2D pages of the 3D geophysical data set substantially simultaneously.

44. The method of claim 1, further comprising transmitting a parameterized description of a set of transitory geophysical analysis events from the generating client to the rest of the plurality of clients without verifying a receipt of the set of transitory geophysical analysis events.

* * * * *